(12) United States Patent
Cheng

(10) Patent No.: US 10,943,085 B2
(45) Date of Patent: Mar. 9, 2021

(54) LIGHT EMITTING DIODE DISPLAY DEVICE WITH INFRARED IDENTIFICATION

(71) Applicant: WUHAN CHINA STAR OPTOELECTRONICS SEMICONDUCTOR DISPLAY TECHNOLOGY CO., LTD., Hubei (CN)

(72) Inventor: Jiangkun Cheng, Hubei (CN)

(73) Assignee: Wuhan China Star Optoelectronics Semiconductor Display Technology Co., Ltd., Hubei (CN)

(*) Notice: Subject to any disclaimer, the term of this patent is extended or adjusted under 35 U.S.C. 154(b) by 0 days.

(21) Appl. No.: 16/619,097

(22) PCT Filed: Nov. 1, 2018

(86) PCT No.: PCT/CN2018/113342
§ 371 (c)(1),
(2) Date: Dec. 4, 2019

(87) PCT Pub. No.: WO2020/047981
PCT Pub. Date: Mar. 12, 2020

(65) Prior Publication Data
US 2020/0334438 A1 Oct. 22, 2020

(30) Foreign Application Priority Data
Sep. 3, 2018 (CN) .................. 201811018249.X

(51) Int. Cl.
*G06K 9/00* (2006.01)
*G09G 3/3225* (2016.01)
(Continued)

(52) U.S. Cl.
CPC ....... *G06K 9/0004* (2013.01); *G06K 9/00006* (2013.01); *G09G 3/3225* (2013.01);
(Continued)

(58) Field of Classification Search
CPC combination set(s) only.
See application file for complete search history.

(56) References Cited

U.S. PATENT DOCUMENTS

2011/0043487 A1 2/2011 Huang et al.
2015/0364107 A1 12/2015 Sakariya et al.
(Continued)

FOREIGN PATENT DOCUMENTS

| CN | 106169484 A | 11/2016 |
|---|---|---|
| CN | 107767816 A | 3/2018 |
| TW | 201103143 A | 1/2011 |

*Primary Examiner* — Robin J Mishler
(74) *Attorney, Agent, or Firm* — Mark M. Friedman

(57) ABSTRACT

A light emitting diode display device with infrared identification includes a plurality of pixel units. Each of the plurality of pixel units includes a first scan line; a second scan line; a first data line; a second data line; a sensing line; a first pixel electrically coupled to the first scan line, the second scan line and the first data line and configured to generate infrared light; a sensing unit electrically coupled to the second scan line and the sensing line and configured to sense the infrared light; and a second pixel electrically coupled to the first scan line and the second data line.

16 Claims, 3 Drawing Sheets

(51) Int. Cl.
*G09G 3/3266* (2016.01)
*G09G 3/3275* (2016.01)

(52) U.S. Cl.
CPC ......... *G09G 3/3266* (2013.01); *G09G 3/3275* (2013.01); *G09G 2310/0202* (2013.01)

(56) References Cited

U.S. PATENT DOCUMENTS

| | | |
|---|---|---|
| 2018/0254288 A1 | 9/2018 | Ling et al. |
| 2019/0065717 A1* | 2/2019 | Won ........................ G06F 21/32 |
| 2019/0333448 A1 | 10/2019 | Kim et al. |

* cited by examiner

LIGHT EMITTING DIODE DISPLAY DEVICE WITH INFRARED IDENTIFICATION

BACKGROUND

Field

The present disclosure relates to the technical field of display devices, and more particularly to a light emitting diode display device with infrared identification.

Background

With the development of multimedia, methods of visual presentation are becoming more and more diversified, and human-computer interaction is becoming more and more frequent. Accordingly, methods of human-computer interaction are valued by users.

Handwriting, fingerprint identification and touch screens are commonly used and popular methods of human-computer interaction. Conventional fingerprint identification depends on add-on fingerprint identification modules, and thus there are many limitations in an aspect of mechanical design. With the popular of full-screen and high screen-to-body ration products, people have high demands for conventional fingerprint identification or biometric identification. In detail, when the fingerprint identification can be implemented through a full screen, an add-on fingerprint identification module is not required. As such, the size and the weight of an electronic device can be reduced.

Consequently, there is a need to solve the above-mentioned problems in the prior art.

SUMMARY OF DISCLOSURE

An objective of the present disclosure is to provide a light emitting diode display device with infrared identification capable of solving the problems in the prior art.

To solve the above problems, a light emitting diode display device with infrared identification provided by the present disclosure includes a plurality of pixel units. Each of the plurality of pixel units includes a first scan line; a second scan line; a first data line; a second data line; a sensing line; a first pixel electrically coupled to the first scan line, the second scan line and the first data line and configured to generate infrared light; a sensing unit electrically coupled to the second scan line and the sensing line and configured to sense the infrared light; a second pixel electrically coupled to the first scan line and the second data line; at least one gate driving unit electrically coupled to the first scan line and the second scan line and configured to sequentially select the first scan line and the second scan line; and at least one reading unit electrically coupled to the sensing line and configured to read out the infrared light sensed by the sensing unit.

In one embodiment, the light emitting diode display device with infrared identification further includes at least one source driving unit. The at least one source driving unit is electrically coupled to the first data line and the second data line and configured to provide a data signal for the first pixel via the first data line and provide a data signal for the second pixel via the second data line.

In one embodiment, the first pixel includes a first thin film transistor, a second thin film transistor, a first light emitting diode, a third thin film transistor, a fourth thin film transistor and an infrared light emitting diode. A gate of the first thin film transistor is electrically coupled to the first scan line, a source of the first thin film transistor is electrically coupled to the first data line, and a drain of the first thin film transistor is electrically coupled to a gate of the second thin film transistor. A source of the second thin film transistor is electrically coupled to a direct-current voltage, and a drain of the second thin film transistor is electrically coupled to the first light emitting diode. A gate of the third thin film transistor is electrically coupled to the second scan line, a source of the third thin film transistor is electrically coupled to the first data line, and a drain of the third thin film transistor is electrically coupled to a gate of the fourth thin film transistor. A source of the fourth thin film transistor is electrically coupled to the direct-current voltage, and a drain of the fourth thin film transistor is electrically coupled to the infrared light emitting diode.

In one embodiment, the sensing unit includes a fifth thin film transistor and a sixth thin film transistor. A gate of the fifth thin film transistor is electrically coupled to the second scan line, a source of the fifth thin film transistor is electrically coupled to the sensing line, and a drain of the fifth thin film transistor is electrically coupled to a drain of the sixth thin film transistor. A gate of the sixth thin film transistor is electrically coupled to a source of the sixth thin film transistor.

In one embodiment, the second pixel includes a seventh thin film transistor, an eighth thin film transistor and a second light emitting diode. A gate of the seventh thin film transistor is electrically coupled to the first scan line, a source of the seventh thin film transistor is electrically coupled to the second data line, and a drain of the seventh thin film transistor is electrically coupled to a gate of the eighth thin film transistor. A source of the eighth thin film transistor is electrically coupled to the direct-current voltage, and a drain of the eighth thin film transistor is electrically coupled to the second light emitting diode.

In one embodiment, in a first state, the first scan line is selected, and the first thin film transistor and the seventh thin film transistor are turned on. In the first state, the second scan line is not selected, the third thin film transistor and the fifth thin film transistor are not turned on, the infrared light emitting diode is not turned on, and the sensing unit does not sense the infrared light.

In one embodiment, in a second state, the first scan line is not selected, and the first thin film transistor and the seventh thin film transistor are not turned on. In the second state, the second scan line is selected, the third thin film transistor and the fifth thin film transistor are turned on, the infrared light emitting diode is turned on, and the sensing unit senses the infrared light.

In one embodiment, the infrared light emitting diode is integrated into the first light emitting diode.

To solve the above problems, a light emitting diode display device with infrared identification provided by the present disclosure includes a plurality of pixel units. Each of the plurality of pixel units includes a first scan line; a second scan line; a first data line; a second data line; a sensing line; a first pixel electrically coupled to the first scan line, the second scan line and the first data line and configured to generate infrared light; a sensing unit electrically coupled to the second scan line and the sensing line and configured to sense the infrared light; and a second pixel electrically coupled to the first scan line and the second data line.

In one embodiment, the light emitting diode display device with infrared identification further includes at least one source driving unit. The at least one source driving unit is electrically coupled to the first data line and the second data line and configured to provide a data signal for the first pixel via the first data line and provide a data signal for the second pixel via the second data line.

In one embodiment, the light emitting diode display device with infrared identification further includes at least one gate driving unit. The at least one gate driving unit is electrically coupled to the first scan line and the second scan line and configured to sequentially select the first scan line and the second scan line.

In one embodiment, the light emitting diode display device with infrared identification further includes at least one reading unit. The at least one reading unit is electrically coupled to the sensing line and configured to read out the infrared light sensed by the sensing unit.

In one embodiment, the first pixel includes a first thin film transistor, a second thin film transistor, a first light emitting diode, a third thin film transistor, a fourth thin film transistor and an infrared light emitting diode. A gate of the first thin film transistor is electrically coupled to the first scan line, a source of the first thin film transistor is electrically coupled to the first data line, and a drain of the first thin film transistor is electrically coupled to a gate of the second thin film transistor. A source of the second thin film transistor is electrically coupled to a direct-current voltage, and a drain of the second thin film transistor is electrically coupled to the first light emitting diode. A gate of the third thin film transistor is electrically coupled to the second scan line, a source of the third thin film transistor is electrically coupled to the first data line, and a drain of the third thin film transistor is electrically coupled to a gate of the fourth thin film transistor. A source of the fourth thin film transistor is electrically coupled to the direct-current voltage, and a drain of the fourth thin film transistor is electrically coupled to the infrared light emitting diode.

In one embodiment, the sensing unit includes a fifth thin film transistor and a sixth thin film transistor. A gate of the fifth thin film transistor is electrically coupled to the second scan line, a source of the fifth thin film transistor is electrically coupled to the sensing line, and a drain of the fifth thin film transistor is electrically coupled to a drain of the sixth thin film transistor. A gate of the sixth thin film transistor is electrically coupled to a source of the sixth thin film transistor.

In one embodiment, the second pixel includes a seventh thin film transistor, an eighth thin film transistor and a second light emitting diode. A gate of the seventh thin film transistor is electrically coupled to the first scan line, a source of the seventh thin film transistor is electrically coupled to the second data line, and a drain of the seventh thin film transistor is electrically coupled to a gate of the eighth thin film transistor. A source of the eighth thin film transistor is electrically coupled to the direct-current voltage, and a drain of the eighth thin film transistor is electrically coupled to the second light emitting diode.

In one embodiment, in a first state, the first scan line is selected, and the first thin film transistor and the seventh thin film transistor are turned on. In the first state, the second scan line is not selected, the third thin film transistor and the fifth thin film transistor are not turned on, the infrared light emitting diode is not turned on, and the sensing unit does not sense the infrared light.

In one embodiment, in a second state, the first scan line is not selected, and the first thin film transistor and the seventh thin film transistor are not turned on. In the second state, the second scan line is selected, the third thin film transistor and the fifth thin film transistor are turned on, the infrared light emitting diode is turned on, and the sensing unit senses the infrared light.

In one embodiment, the infrared light emitting diode is integrated into the first light emitting diode.

Compared to the prior art, in the light emitting diode display device of the present disclosure, the infrared light emitting diode and the sensing unit are manufactured in a display area (a pixel array). Accordingly, an add-on identification module is not required, thereby implementing identification (e.g., fingerprint identification) through a full screen and reducing the size and the weight of the light emitting diode display device.

DETAILED DESCRIPTION OF PREFERRED EMBODIMENTS

Hereinafter, exemplary embodiments of the present disclosure will be described with reference to the accompanying drawings for illustrating specific embodiments which can be carried out by the present disclosure.

Figure 1:
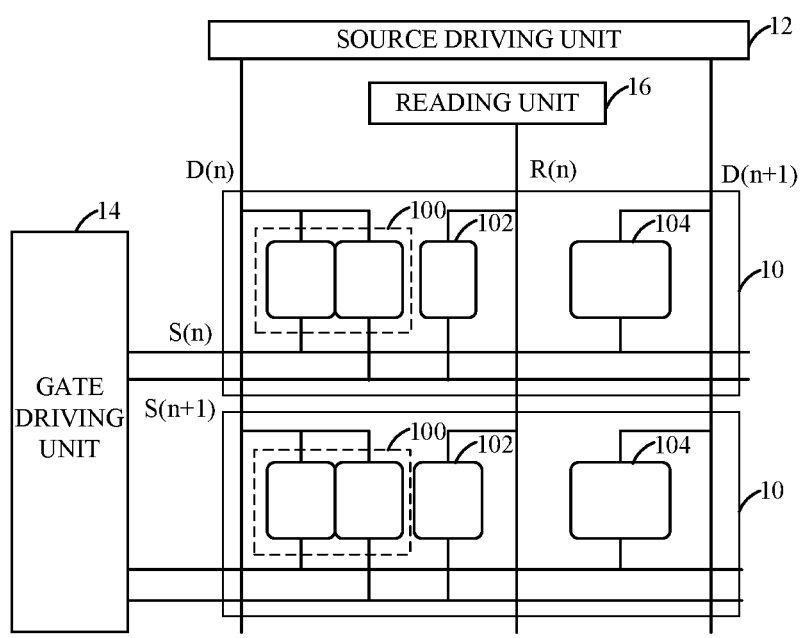
FIG. 1 illustrates a light emitting diode display device with infrared identification in accordance with an embodiment of the present disclosure.
Figure 2:
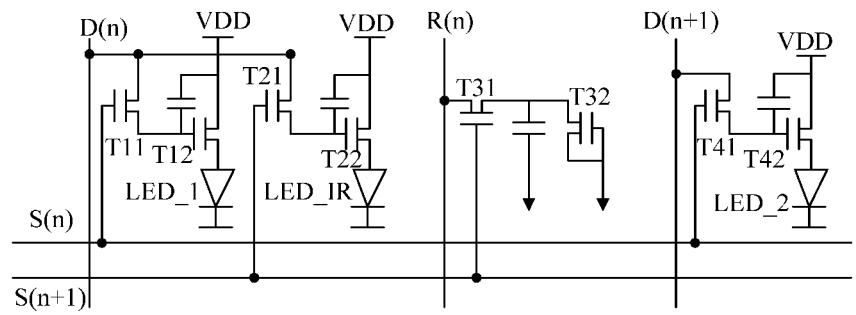
FIG. 2 illustrates a circuit diagram of a pixel unit in accordance with an embodiment of the present disclosure.

Please refer to FIG. 1 and FIG. 2. FIG. 1 illustrates a light emitting diode display device with infrared identification in accordance with an embodiment of the present disclosure. FIG. 2 illustrates a circuit diagram of a pixel unit in accordance with an embodiment of the present disclosure.

The light emitting diode display device may be an organic light emitting diode display device. The light emitting diode display device includes a plurality of pixel units 10, at least one source driving unit 12 (one source driving unit 12 is shown in FIG. 1), at least one gate driving unit 14 (one gate driving unit 14 is shown in FIG. 1) and at least one reading unit 16 (one reading unit 16 is shown in FIG. 1).

The pixel units 10 are electrically coupled to the source driving unit 12, the gate driving unit 14 and the reading unit 16. Each of the pixel units 10 includes a first scan line S(n), a second scan line S(n+1), a first data line D(n), a second data line D(n+1), a sensing line R(n), a first pixel 100, a sensing unit 102 and a second pixel 104.

The first scan line S(n) and the second scan line S(n+1) are formed in a first direction. The first data line D(n), the second data line D(n+1) and the sensing line R(n) are formed in a second direction. The first direction is perpendicular to the second direction.

The source driving unit 12 is electrically coupled to the first data line D(n) and the second data line D(n+1) and configured to provide a data signal for the first pixel 100 via the first data line D(n) and provide a data signal for the second pixel 104 via the second data line D(n+1).

The gate driving unit 14 is electrically coupled to the first scan line S(n) and the second scan line S(n+1) and configured to sequentially select the first scan line S(n) and the second scan line S(n+1) to sequentially turn on the first scan line S(n) and the second scan line S(n+1).

The reading unit 16 is electrically coupled to the sensing line R(n) and configured to read out infrared light sensed by the sensing unit 102.

In one embodiment, the reading unit 16 may be integrated into the source driving unit 12.

The first pixel 100 is electrically coupled to the first scan line S(n), the second scan line S(n+1) and the first data line D(n). The first pixel 100 is configured to display an image and generate infrared light. The first pixel 100 includes a first thin film transistor (TFT) T11, a second thin film transistor T12, a first light emitting diode LED_1, a third thin film transistor T21, a fourth thin film transistor T22 and an infrared light emitting diode LED_IR.

The first thin film transistor (TFT) T11, the second thin film transistor T12 and the first light emitting diode LED_1 are configured to display the image. The third thin film transistor T21, the fourth thin film transistor T22 and the infrared light emitting diode LED_IR are configured to emit the infrared light.

A gate of the first thin film transistor T11 is electrically coupled to the first scan line S(n). A source of the first thin film transistor T11 is electrically coupled to the first data line D(n). A drain of the first thin film transistor T11 is electrically coupled to a gate of the second thin film transistor T12.

A source of the second thin film transistor T12 is electrically coupled to a direct-current voltage VDD. A drain of the second thin film transistor T12 is electrically coupled to the first light emitting diode LED_1.

A gate of the third thin film transistor T21 is electrically coupled to the second scan line S(n+1). A source of the third thin film transistor T21 is electrically coupled to the first data line D(n). A drain of the third thin film transistor T21 is electrically coupled to a gate of the fourth thin film transistor T22.

A source of the fourth thin film transistor T22 is electrically coupled to the direct-current voltage VDD. A drain of the fourth thin film transistor T22 is electrically coupled to the infrared light emitting diode LED_IR.

The sensing unit 102 is electrically coupled to the second scan line S(n+1) and the sensing line R(n) and configured to sense the infrared light emitted by the infrared light emitting diode LED_IR or infrared light in the environment. The sensing unit 102 includes a fifth thin film transistor T31 and a sixth thin film transistor T32.

A gate of the fifth thin film transistor T31 is electrically coupled to the second scan line S(n+1). A source of the fifth thin film transistor T31 is electrically coupled to the sensing line R(n). A drain of the fifth thin film transistor T31 is electrically coupled to a drain of the sixth thin film transistor T32.

A gate of the sixth thin film transistor T32 is electrically coupled to a source of the sixth thin film transistor T32.

One feature of the light emitting diode display device of the present disclosure is that the infrared light emitting diode LED_IR (configured to emit the infrared light) and the sensing unit 102 (configured to sense the infrared light) are manufactured in a display area (a pixel array). Accordingly, an add-on identification module is not required, thereby implementing identification (e.g., fingerprint identification) through a full screen and reducing the size and the weight of the light emitting diode display device.

The infrared light emitting diode LED_IR (configured to emit the infrared light), the sensing unit 102 (configured to sense the infrared light) and the reading unit 16 can achieve functions of fingerprint identification, high-precision handwriting input identification, gesture operation identification and infrared imaging.

The second pixel 104 is electrically coupled to the first scan line S(n) and the second data line D(n+1). The second pixel 104 includes a seventh thin film transistor T41, an eighth thin film transistor T42 and a second light emitting diode LED_2.

A gate of the seventh thin film transistor T41 is electrically coupled to the first scan line S(n). A source of the seventh thin film transistor T41 is electrically coupled to the second data line D(n+1). A drain of the seventh thin film transistor T41 is electrically coupled to a gate of the eighth thin film transistor T42.

A source of the eighth thin film transistor T42 is electrically coupled to the direct-current voltage VDD. A drain of the eighth thin film transistor T42 is electrically coupled to the second light emitting diode LED_2.

Figure 3:
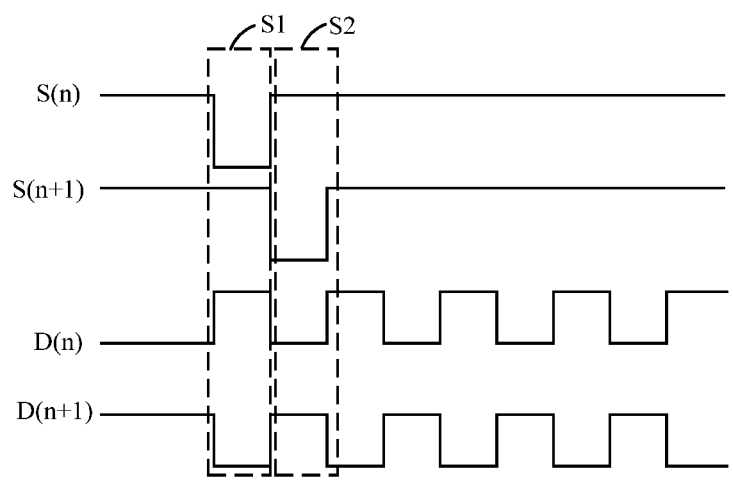
FIG. 3 illustrates waveforms of a first scan line S(n), a second scan line S(n+1), a first data line D(n) and a second data line D(n+1).

Please refer to FIG. 1 to FIG. 3. FIG. 3 illustrates waveforms of the first scan line S(n), the second scan line S(n+1), the first data line D(n) and the second data line D(n+1).

In a first state S1, the first scan line S(n) is selected (at a low voltage level). The first thin film transistor T11 and the seventh thin film transistor T41 are turned on. The data signal of the first data line D(n) is written into the first pixel 100 (for controlling the first light emitting diode LED_1 to emit light or not to emit light). The data signal of the second data line D(n+1) is written into the second pixel 104 (for controlling the second light emitting diode LED_2 to emit light or not to emit light).

In the first state S1, the second scan line S(n+1) is not selected (at a high voltage level). The third thin film transistor T21 and the fifth thin film transistor T31 are not turned on. The infrared light emitting diode LED_IR is not turned on (does not emit light). The sensing unit 102 does not sense the infrared light.

In a second state S2, the first scan line S(n) is not selected (at the high voltage level). The first thin film transistor T11 and the seventh thin film transistor T41 are not turned on. The data signal of the first data line D(n) is not written into the first pixel 100. The data signal of the second data line D(n+1) is not written into the second pixel 104.

In the second state S2, the second scan line S(n+1) is selected (at the low voltage level). The third thin film transistor T21 and the fifth thin film transistor T31 are turned on. The infrared light emitting diode LED_IR is turned on (emits the light). The sensing unit 102 senses the infrared light.

Figure 4:
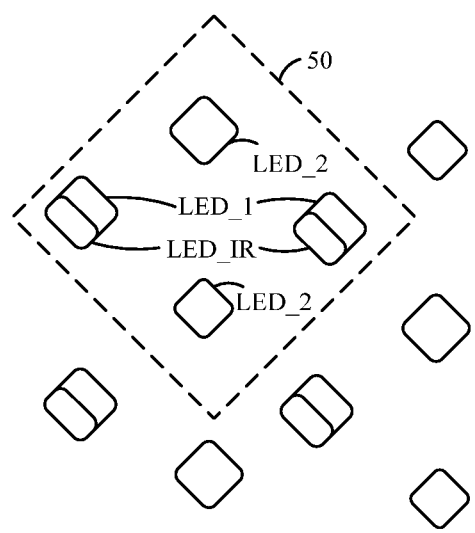
FIG. 4 illustrates an arrangement of a first light emitting diode LED_1, an infrared light emitting diode LED_IR and a second light emitting diode LED_2.

Please refer to FIG. 4. FIG. 4 illustrates an arrangement of the first light emitting diode LED_1, the infrared light emitting diode LED_IR and the second light emitting diode LED_2.

The first light emitting diode LED_1, the infrared light emitting diode LED_IR and the second light emitting diode LED_2 are arranged in a diamond shape. In one embodiment, since changes of characteristics (e.g., luminous efficiency and lifespan) of green light emitting diodes are smaller than changes of characteristics of red light emitting diodes and changes of characteristics of blue light emitting diodes, the infrared light emitting diode LED_IR is integrated into the first light emitting diode LED_1 which is a green light emitting diode. As such, space can be effectively utilized, and effect of the infrared light emitting diode LED_IR on resolution can be decreased. That is, the first light emitting diode LED_1 may be a green light emitting diode, and the second light emitting diode LED_2 may be a red light emitting diode or a blue light emitting diode.

In a diamond area 50 shown in FIG. 4, the infrared light emitting diode LED_IR is integrated into the green light emitting diode at each of two ends of one diagonal line, and the red light emitting diode and the blue light emitting diode are respectively disposed at two ends of the other diagonal line. Accordingly, the green light emitting diode, the red light emitting diode, the blue light emitting diode and the infrared light emitting diode LED_IR are included in the diamond area 50.

It is noted that the infrared light emitting diode LED_IR may also be integrated into the red light emitting diode or the blue light emitting diode.

Figure 5:
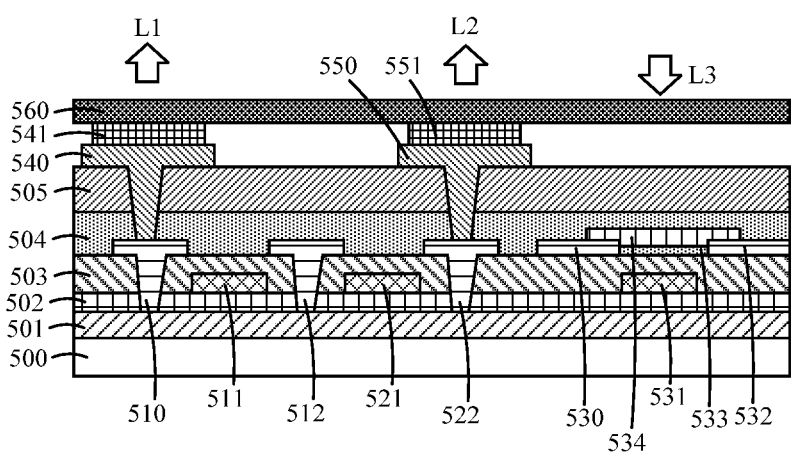
FIG. 5 illustrates a part of a structural diagram of the first light emitting diode LED_1, the infrared light emitting diode LED_IR and the sensing unit 102.

Please refer to FIG. 5. FIG. 5 illustrates a part of a structural diagram of the first light emitting diode LED_1, the infrared light emitting diode LED_IR and the sensing unit 102.

A flexible substrate 500 may be but not limited to a polyimide (PI) substrate.

A material of a semiconductor layer 501 may be, for example, low temperature poly-silicon (LTPS).

A buffer layer may be disposed between the substrate 500 and the semiconductor layer 501.

A material of insulating layers 502 and 503 may be, for example, silicon nitride (SiNx) or silicon dioxide ($SiO_2$).

Translucent organic insulating layers 504 and 505 are required to have a good transmittance for the infrared light.

Metal conductive layers 510, 511 and 512 serve as the electrodes (the gate, the source and the drain) of the thin film transistor in FIG. 2 (the first thin film transistor T11 or the second thin film transistor T12) for controlling the first light emitting diode LED_1.

Metal conductive layers 512, 521 and 522 serve as the electrodes (the gate, the source and the drain) of the thin film transistor in FIG. 2 (the third thin film transistor T21 or the fourth thin film transistor T22) for controlling the infrared light emitting diode LED_IR.

Metal conductive layers 530, 531 and 532 serve as the electrodes (the gate, the source and the drain) of the thin film transistor (the fifth thin film transistor T31 or the sixth thin film transistor T32) of the sensing unit 102 in FIG. 2.

An anode 540, an organic light emitting diode 541 and a cathode 560 together form the first light emitting diode LED_1 in FIG. 2. The anode 540 has a reflecting layer, for example, ITO-Ag-ITO. The organic light emitting diode 541 can generate red light, green light or blue light. The cathode 560 is a transparent electrode.

An anode 550, an organic light emitting diode 551 and the cathode 560 together form the infrared light emitting diode LED_IR in FIG. 2. The anode 550 has a reflecting layer, for example, ITO-Ag-ITO. The organic light emitting diode 551 can generate infrared light.

A semiconductor layer 533 and a light blocking layer 504 together form a light sensing structure of the sensing unit 102 in FIG. 2. The semiconductor layer 533 is sensitive to the infrared light and may be, for example, amorphous silicon (a-Si) doping germanium (Ge). When the infrared light illuminates the semiconductor layer 533, a current of the thin film transistor (the fifth thin film transistor T31 or the sixth thin film transistor T32) of the sensing unit 102 is affected. The light blocking layer 534 can block visible light and pass the infrared light. The light blocking layer 534 may have, for example, a membrane structure having amorphous silicon doping germanium (a-SiGe).

Light L1 is visible light emitted by the first light emitting diode LED_1 of the first pixel 100 in FIG. 2 when the image is displayed. Light L2 is infrared light emitted by the infrared light emitting diode LED_IR in FIG. 2. Light L3 is reflected infrared light after the light L2 reaches an object to be identified, or L3 is infrared light in the environment.

In the light emitting diode display device of the present disclosure, the infrared light emitting diode and the sensing unit are manufactured in a display area (a pixel array). Accordingly, an add-on identification module is not required, thereby implementing identification (e.g., fingerprint identification) through a full screen and reducing the size and the weight of the light emitting diode display device.

In summary, although the present disclosure has been provided in the preferred embodiments described above, the foregoing preferred embodiments are not intended to limit the present disclosure. Those skilled in the art, without departing from the spirit and scope of the present disclosure, may make modifications and variations, so the scope of the protection of the present disclosure is defined by the claims.

What is claimed is:

1. A light emitting diode display device with infrared identification, comprising a plurality of pixel units, each of the plurality of pixel units comprising:
   a first scan line;
   a second scan line;
   a first data line;
   a second data line;
   a sensing line;
   a first pixel electrically coupled to the first scan line, the second scan line and the first data line and configured to generate infrared light;
   a sensing unit electrically coupled to the second scan line and the sensing line;
   a second pixel electrically coupled to the first scan line and the second data line;
   at least one gate driving unit electrically coupled to the first scan line and the second scan line and configured to sequentially select the first scan line and the second scan line; and
   at least one reading unit electrically coupled to the sensing line and configured to read out the infrared light sensed by the sensing unit;
   wherein in a first state, the first scan line is selected;
   in the first state, the second scan line is not selected, and the sensing unit does not sense the infrared light;
   wherein the first pixel comprises a first thin film transistor, a second thin film transistor, a first light emitting diode, a third thin film transistor, a fourth thin film transistor and an infrared light emitting diode;
   a gate of the first thin film transistor is electrically coupled to the first scan line, a source of the first thin film transistor is electrically coupled to the first data line, and a drain of the first thin film transistor is electrically coupled to a gate of the second thin film transistor;
   a source of the second thin film transistor is electrically coupled to a direct-current voltage, and a drain of the second thin film transistor is electrically coupled to the first light emitting diode;
   a gate of the third thin film transistor is electrically coupled to the second scan line, a source of the third thin film transistor is electrically coupled to the first data line, and a drain of the third thin film transistor is electrically coupled to a gate of the fourth thin film transistor;
   a source of the fourth thin film transistor is electrically coupled to the direct-current voltage, and a drain of the fourth thin film transistor is electrically coupled to the infrared light emitting diode.

2. The light emitting diode display device with infrared identification of claim 1, further comprising at least one source driving unit, the at least one source driving unit electrically coupled to the first data line and the second data line and configured to provide a data signal for the first pixel via the first data line and provide a data signal for the second pixel via the second data line.

3. The light emitting diode display device with infrared identification of claim 1, wherein the sensing unit comprises a fifth thin film transistor and a sixth thin film transistor;
- a gate of the fifth thin film transistor is electrically coupled to the second scan line, a source of the fifth thin film transistor is electrically coupled to the sensing line, and a drain of the fifth thin film transistor is electrically coupled to a drain of the sixth thin film transistor;
- a gate of the sixth thin film transistor is electrically coupled to a source of the sixth thin film transistor.

4. The light emitting diode display device with infrared identification of claim 3, wherein the second pixel comprises a seventh thin film transistor, an eighth thin film transistor and a second light emitting diode;
- a gate of the seventh thin film transistor is electrically coupled to the first scan line, a source of the seventh thin film transistor is electrically coupled to the second data line, and a drain of the seventh thin film transistor is electrically coupled to a gate of the eighth thin film transistor;
- a source of the eighth thin film transistor is electrically coupled to the direct-current voltage, and a drain of the eighth thin film transistor is electrically coupled to the second light emitting diode.

5. The light emitting diode display device with infrared identification of claim 4, wherein in the first state, the first thin film transistor and the seventh thin film transistor are turned on;
- in the first state, the third thin film transistor and the fifth thin film transistor are not turned on, and the infrared light emitting diode is not turned on.

6. The light emitting diode display device with infrared identification of claim 5, wherein in a second state, the first scan line is not selected, and the first thin film transistor and the seventh thin film transistor are not turned on;
- in the second state, the second scan line is selected, the third thin film transistor and the fifth thin film transistor are turned on, the infrared light emitting diode is turned on, and the sensing unit senses the infrared light.

7. The light emitting diode display device with infrared identification of claim 1, wherein the infrared light emitting diode is integrated into the first light emitting diode.

8. A light emitting diode display device with infrared identification, comprising a plurality of pixel units, each of the plurality of pixel units comprising:
- a first scan line;
- a second scan line;
- a first data line;
- a second data line;
- a sensing line;
- a first pixel electrically coupled to the first scan line, the second scan line and the first data line and configured to generate infrared light;
- a sensing unit electrically coupled to the second scan line and the sensing line; and
- a second pixel electrically coupled to the first scan line and the second data line;
- wherein in a first state, the first scan line is selected;

in the first state, the second scan line is not selected, and the sensing unit does not sense the infrared light;
wherein the first pixel comprises a first thin film transistor, a second thin film transistor, a first light emitting diode, a third thin film transistor, a fourth thin film transistor and an infrared light emitting diode;
- a gate of the first thin film transistor is electrically coupled to the first scan line, a source of the first thin film transistor is electrically coupled to the first data line, and a drain of the first thin film transistor is electrically coupled to a gate of the second thin film transistor;
- a source of the second thin film transistor is electrically coupled to a direct-current voltage, and a drain of the second thin film transistor is electrically coupled to the first light emitting diode;
- a gate of the third thin film transistor is electrically coupled to the second scan line, a source of the third thin film transistor is electrically coupled to the first data line, and a drain of the third thin film transistor is electrically coupled to a gate of the fourth thin film transistor;
- a source of the fourth thin film transistor is electrically coupled to the direct-current voltage, and a drain of the fourth thin film transistor is electrically coupled to the infrared light emitting diode.

9. The light emitting diode display device with infrared identification of claim 8, further comprising at least one source driving unit, the at least one source driving unit electrically coupled to the first data line and the second data line and configured to provide a data signal for the first pixel via the first data line and provide a data signal for the second pixel via the second data line.

10. The light emitting diode display device with infrared identification of claim 8, further comprising at least one gate driving unit, the at least one gate driving unit electrically coupled to the first scan line and the second scan line and configured to sequentially select the first scan line and the second scan line.

11. The light emitting diode display device with infrared identification of claim 8, further comprising at least one reading unit, the at least one reading unit electrically coupled to the sensing line and configured to read out the infrared light sensed by the sensing unit.

12. The light emitting diode display device with infrared identification of claim 8, wherein the sensing unit comprises a fifth thin film transistor and a sixth thin film transistor;
- a gate of the fifth thin film transistor is electrically coupled to the second scan line, a source of the fifth thin film transistor is electrically coupled to the sensing line, and a drain of the fifth thin film transistor is electrically coupled to a drain of the sixth thin film transistor;
- a gate of the sixth thin film transistor is electrically coupled to a source of the sixth thin film transistor.

13. The light emitting diode display device with infrared identification of claim 12, wherein the second pixel comprises a seventh thin film transistor, an eighth thin film transistor and a second light emitting diode;
- a gate of the seventh thin film transistor is electrically coupled to the first scan line, a source of the seventh thin film transistor is electrically coupled to the second data line, and a drain of the seventh thin film transistor is electrically coupled to a gate of the eighth thin film transistor;
- a source of the eighth thin film transistor is electrically coupled to the direct-current voltage, and a drain of the eighth thin film transistor is electrically coupled to the second light emitting diode.

14. The light emitting diode display device with infrared identification of claim 13, wherein in the first state, the first thin film transistor and the seventh thin film transistor are turned on;

in the first state, the third thin film transistor and the fifth thin film transistor are not turned on, and the infrared light emitting diode is not turned on.

15. The light emitting diode display device with infrared identification of claim 14, wherein in a second state, the first scan line is not selected, and the first thin film transistor and the seventh thin film transistor are not turned on;

in the second state, the second scan line is selected, the third thin film transistor and the fifth thin film transistor are turned on, the infrared light emitting diode is turned on, and the sensing unit senses the infrared light.

16. The light emitting diode display device with infrared identification of claim 8, wherein the infrared light emitting diode is integrated into the first light emitting diode.

\* \* \* \* \*